United States Patent
Assink et al.

(10) Patent No.: US 7,659,359 B1
(45) Date of Patent: Feb. 9, 2010

(54) STABILIZATION OF ISOSORBIDE-BASED POLYCARBONATE

(75) Inventors: Roland Assink, Vlissingen (NL); Hans de Brouwer, Oisterwijk (NL); Bernd Jansen, Bergen op Zoom (NL); Jan Henk Kamps, Bergen op Zoom (NL); Wilhelmus Johannes Daniel Steendam, Bergen op Zoom (NL); Jan-Willem Goedmakers, Putte (NL)

(73) Assignee: Sabic Innovative Plastics IP B.V., Bergen op Zoom (NL)

( * ) Notice: Subject to any disclaimer, the term of this patent is extended or adjusted under 35 U.S.C. 154(b) by 0 days.

(21) Appl. No.: 12/273,132

(22) Filed: Nov. 18, 2008

(51) Int. Cl.
*C08G 64/00* (2006.01)
*C08G 63/00* (2006.01)

(52) U.S. Cl. .................... 528/196; 524/502; 524/599; 525/410; 528/198; 528/271; 528/272

(58) Field of Classification Search ............... 524/502, 524/599; 525/410; 528/196, 198, 271, 272
See application file for complete search history.

(56) References Cited

U.S. PATENT DOCUMENTS

| 4,323,668 | A  | 4/1982  | Brunelle |
| 6,420,512 | B1 | 7/2002  | McCloskey et al. |
| 6,506,871 | B1 | 1/2003  | Silvi et al. |
| 6,518,391 | B1 | 2/2003  | McCloskey et al. |
| 6,548,623 | B2 | 4/2003  | Brunelle et al. |
| 6,790,929 | B2 | 9/2004  | Silvi et al. |
| 7,041,775 | B2 | 5/2006  | Marinez et al. |
| 7,132,498 | B2 | 11/2006 | McCloskey et al. |
| 7,138,479 | B2 | 11/2006 | Dhara et al. |
| 2003/0139529 | A1 | 7/2003 | O'Neil et al. |
| 2003/0149223 | A1 | 8/2003 | McCloskey et al. |
| 2008/0004379 | A1 | 1/2008 | Berndsen et al. |
| 2009/0088540 | A1 | 4/2009 | Brack et al. |

*Primary Examiner*—Terressa M Boykin
(74) *Attorney, Agent, or Firm*—Larson & Anderson, LLC

(57) ABSTRACT

An isosorbide-containing polycarbonate composition is provided. The composition contains a polycarbonate having repeat units derived from isosorbide, a polycarbonate-property-modifying additive, and a pH stabilizer. When a solution containing 10 wt. % of the composition dissolved in dichloromethane is prepared the solution has a non-aqueous pH in a range of equal to or between 0.8 below and 0.5 above the pH of the dichloromethane.

19 Claims, 4 Drawing Sheets

STABILIZATION OF ISOSORBIDE-BASED POLYCARBONATE

BACKGROUND

There is a significant interest in preparing polymers from materials derived from biomass. The diol 1,4:3,6-dianhydro-D-sorbitol, hereinafter referred to as isosorbide, is readily made from renewable resources, such as from sugars and starches. According to the following reaction scheme, isosorbide can be made from biomass derived starch through hydrolysis, hydrogenation, and dehydration reactions.

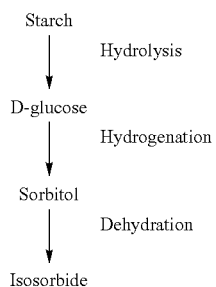

Isosorbide has been used as a monomer in the subsequent formation of copolycarbonate polymers as described in U.S. Pat. No. 7,138,479. This patent notes that copolycarbonates of isosorbide with BPA and homopolycarbonate of isosorbide made by the melt route using BMSC or DPC as the carbonate source may discolor when exposed to high temperatures greater than 250° C. Residual catalyst in the polycarbonate is indicated as a potential contributor to the discoloration. Isosorbide is also listed as a possible aliphatic diacid comonomer for inclusion in polycarbonates in U.S. Pat. Nos. 7,132,498 and 7,041,775.

SUMMARY OF THE INVENTION

It has been found quite unexpectedly that polycarbonate molding compositions containing polycarbonate-property-modifying agents (e.g. additives such as impact modifiers, colorants, and stabilizers) that are acidic or basic mixed with polycarbonate containing repeat units derived from isosorbide have variable color and color instability that can be induced by processing conditions (temperature, residence time) and by light exposure (visible light, UV irradiation) as well as by exposure to heat and humidity. This is particularly unexpected because, inter alia, polycarbonate compositions having polycarbonate-property-modifying agents mixed with polycarbonate containing no isosorbide (e.g. traditional bisphenol-A-type polycarbonate) do not show similar color variability.

Studies were conducted to determine what was causing the color variability of isosorbide-containing polymer compositions and it was determined that the pH of the compositions was related to the property qualities of the molded composition. Without being bound by a particular mechanism, the present inventors believe that isosorbide-containing polycarbonate is unexpectedly susceptible to polymer degradation reactions that are catalyzed by either acidic or basic environments at elevated temperatures (e.g. such as those used during molding the composition).

The present invention provides methods of forming isosorbide-containing polycarbonate compositions with steps including adjusting the pH of the polycarbonate composition. The present invention also provides pH-stabilized isosorbide-containing polycarbonate compositions.

In a first embodiment a method of forming an isosorbide-containing polycarbonate composition comprises the steps of: (I) combining a polycarbonate comprising repeat units derived from isosorbide with a polycarbonate-property-modifying additive to form a polycarbonate composition, (II) dissolving a sample from the polycarbonate composition in a non-aqueous solvent to form a polycarbonate composition solution, (III) determining the non-aqueous pH of the polycarbonate composition solution and determining the non-aqueous pH of the solvent, (IV) comparing the pH of the solvent with the pH of the polycarbonate composition solution, and if the pH of the polycarbonate composition solution is more than 0.8 below or more than 0.5 above the pH of the solvent then taking an action selected from the group consisting of: (a) if the polycarbonate composition solution has a pH that is more than 0.5 above the pH of the solvent, adding an acid stabilizer to the polycarbonate composition to form an acid stabilized polycarbonate composition, wherein the acid stabilizer is added to the polycarbonate composition in an amount such that a sample of the acid stabilized polycarbonate composition dissolved in the solvent has a non-aqueous pH that is in a range of equal to or between 0.8 below and 0.5 above the pH of the solvent, and (b) if the polycarbonate composition solution has a pH that is more than 0.8 below the pH of the solvent, adding a base stabilizer to the polycarbonate composition to form a base stabilized polycarbonate composition, wherein the base stabilizer is added to the polycarbonate composition in an amount such that a sample of the base stabilized polycarbonate composition dissolved in the solvent has a non-aqueous pH that is in a range of equal to or between 0.8 below and 0.5 above the pH of the solvent, thereby forming an isosorbide-containing polycarbonate composition.

In a second embodiment a method of forming an isosorbide-containing polycarbonate composition comprises the steps of: (I) combining a polycarbonate comprising repeat units derived from isosorbide with a polycarbonate-property-modifying additive to form a polycarbonate composition, (II) adding a pH stabilizing agent to the polycarbonate composition to form a pH stabilized polycarbonate composition, wherein the pH stabilizing agent is added to the polycarbonate composition in an amount such that a sample of the pH stabilized polycarbonate composition dissolved in dichloromethane forms a 10 wt % polycarbonate composition solution which has a non-aqueous pH that is in a range of equal to or between 0.8 below and 0.5 above the non-aqueous pH of dichloromethane, thereby forming an isosorbide-containing polycarbonate composition.

In a third embodiment, an isosorbide-containing polycarbonate composition comprises a polycarbonate comprising repeat units derived from isosorbide, a polycarbonate-property-modifying additive, and a pH stabilizer, wherein when a solution containing 10 wt. % of the polycarbonate composition dissolved in dichloromethane is prepared the solution has a non-aqueous pH in a range of equal to or between 0.8 below and 0.5 above the pH of the dichloromethane (DCM). For example at room temperature DCM has a pH of about 5.7 and the pH of the polycarbonate composition solution has pH of equal to or between about 4.9 to 6.2.

DETAILED DESCRIPTION

Figure 1:
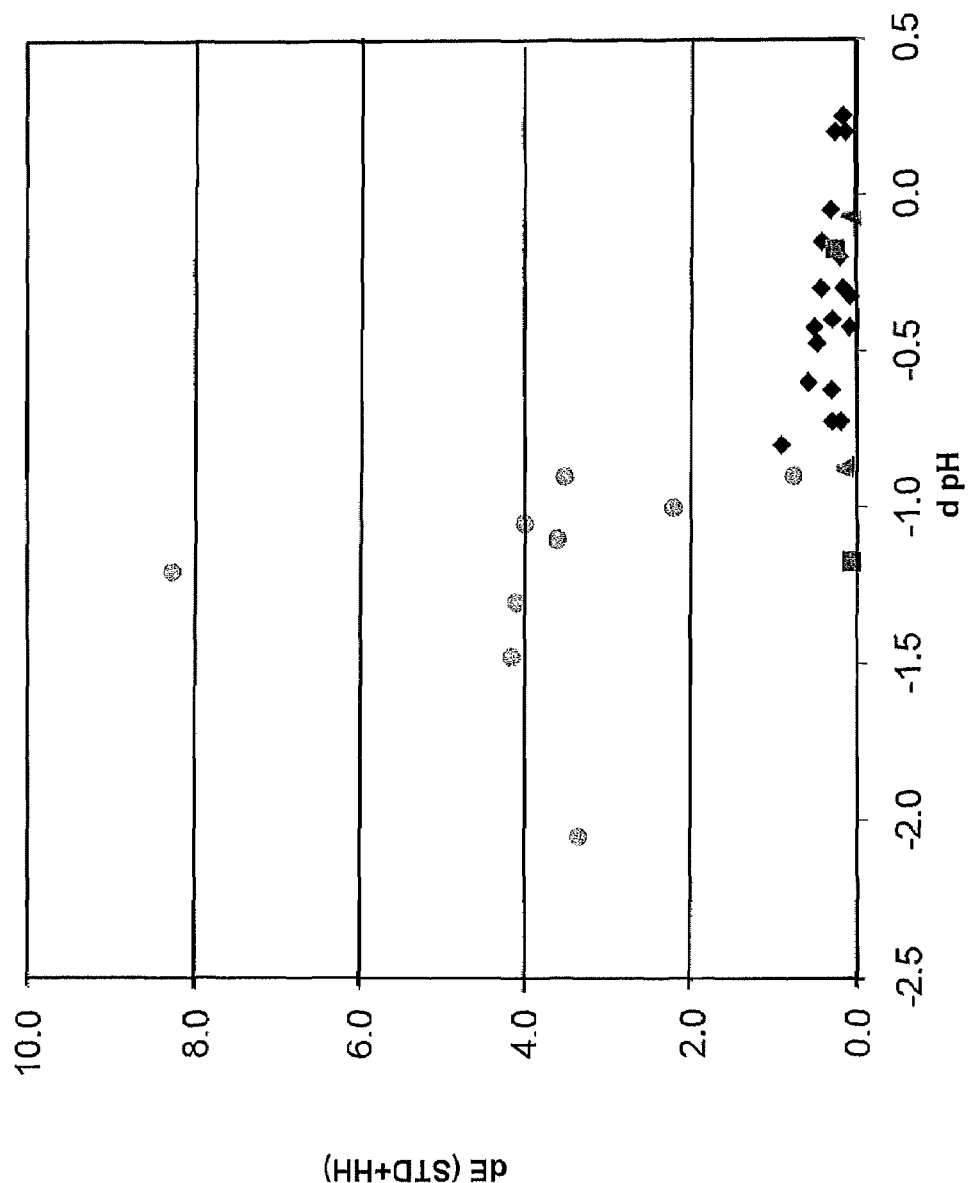
FIGS. 1-4 are graphical representations of results obtained in the example section.

The present invention may be understood more readily by reference to the following detailed description of preferred embodiments of the invention and the examples included herein. The present invention relates to isosorbide-containing polycarbonate compositions and to methods of forming the compositions.

It has been found quite unexpectedly that polycarbonate compositions having polycarbonate-property-modifying agents (e.g. additives such as impact modifiers, colorants, and stabilizers) that are acidic or basic mixed with polycarbonate containing repeat units derived from isosorbide have many undesirable properties, including color instability that can be induced by variations in molding conditions, light, heat, and humidity. The present finding is particularly unexpected because, inter alia, polycarbonate compositions having polycarbonate-property-modifying agents mixed with polycarbonate containing no isosorbide (e.g. traditional bisphenol-A-type polycarbonate) do not show similar reduction in color properties. Studies were conducted to determine what was causing the color property variations of isosorbide-containing polymer compositions and it was determined that the pH of the compositions was related to color properties of the molded composition. Without being bound by a particular mechanism, the present Inventors believe that isosorbide-containing polycarbonate is unexpectedly susceptible polymer degradation reactions that are catalyzed by either acidic or basic environments.

DEFINITIONS

As used in the specification and claims of this application, the following definitions, should be applied.

"a", "an", and "the" as an antecedent refer to either the singular or plural. For example, "an aromatic dihydroxy compound" refers to either a single species of compound or a mixture of such species unless the context indicates otherwise.

"polycarbonate" refers to an oligomer or polymer comprising residues of at least one monomer compound (e.g. a dihydroxy compound) joined by carbonate linkages. In certain embodiments of the invention, the polycarbonate comprises residues of an aromatic dihydroxy compound and has a number average molecular weight, Mn, measured relative to polystyrene (PS) standards of between 10,000 g/mol and 160,000 g/mol. In specific embodiments, the Mn measured relative to PS is between 13,000 g/mol and 160,000 g/mol, for example between 15,000 g/mol and 160,000 g/mol. In another embodiment, the Mn (PS) is between 15,000 g/mol and 102,000 g/mol. The term "polycarbonate" encompasses poly(carbonate-coester) oligomers and polymers. Nothing in the description and claims of this application should be taken as limiting the polycarbonate to only one monomer residue unless the context is expressly limiting. Thus, the application encompasses copolycarbonates with residues of 2, 3, 4, or more types of monomer compounds.

The term "dissolving" as it relates to dissolving a sample in a solvent to prepare a solution for the determination of the non-aqueous pH of the solution in herein understood to mean that the acidic and basic components of the composition(s) are made available for detection in the non-aqueous pH measurement of the prepared solution. In a preferred embodiment the entire sample is dissolved or dissolvable in the selected solvent. However, some compositions of the present invention may comprises components that are not completely dissolvable in the selected solvent. In these later embodiments, the solvent is preferably selected such that the acidic and/or basic components of the composition are made available (e.g. made swollen and mobile) for detection and quantification.

The phrases "more than 0.8 below or more than 0.5 above the pH of the solvent", "more than 0.5 below or more than 0.3 above the pH of the solvent", and related phrases found throughout the specification refer to the comparison of the non-aqueous pH of the polycarbonate composition sample solution as compared to the non-aqueous pH of the pure solvent (e.g. the solvent without the polycarbonate composition present) that is used in the polycarbonate composition sample solution. For example the pH of the polycarbonate composition sample solution will have a pH of more than 0.8 below or more than 0.5 above the pH of the solvent when $pH_{sample} - pH_{solvent}$ is $<-0.8$ or $>+0.5$. The pH of the polycarbonate composition sample solution will have a pH in a range of equal to or between 0.8 below and 0.5 above the pH of the solvent when $pH_{sample} - pH_{solvent}$ is $\geq -0.8$ and $\leq +0.5$, and so on.

Reference throughout the specification to "one embodiment," "another embodiment," "an embodiment," "some embodiments," and so forth, means that a particular element (e.g., feature, structure, property, and/or characteristic) described in connection with the embodiment is included in at least one embodiment described herein, and may or may not be present in other embodiments. In addition, it is to be understood that the described element(s) may be combined in any suitable manner in the various embodiments.

Numerical values in the specification and claims of this application, particularly as they relate to polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

As described above, the present invention provides a method of forming an isosorbide-containing polycarbonate composition comprising a step of comparing the non-aqueous pH of the polycarbonate composition dissolved in a non-aqueous solvent to the pH of the solvent. If necessary the pH of the polycarbonate composition is adjusted toward that of the solvent. The present invention provides a pH-stabilized isosorbide-containing polycarbonate.

In a first embodiment a method of forming an isosorbide-containing polycarbonate composition comprises the steps of: (I) combining a polycarbonate comprising repeat units derived from isosorbide with a polycarbonate-property-modifying additive to form a polycarbonate composition, (II) dissolving a sample from the polycarbonate composition in a non-aqueous solvent to form a polycarbonate composition solution, (III) determining the non-aqueous pH of the polycarbonate composition solution and determining the non-aqueous pH of the solvent, (IV) comparing the pH of the solvent with the pH of the polycarbonate composition solution, and if the pH of the polycarbonate composition solution is more than 0.8 below or more than 0.5 above the pH of the solvent then taking an action selected from the group consisting of: (a) if the polycarbonate composition solution has a pH that is more than 0.5 above the pH of the solvent, adding an acid stabilizer to the polycarbonate composition to form an acid stabilized polycarbonate composition, wherein the acid stabilizer is added to the polycarbonate composition in an amount such that a sample of the acid stabilized polycarbonate composition dissolved in the solvent has a non-aqueous pH that is in a range of equal to or between 0.8 below and 0.5 above the pH of the solvent, and (b) if the polycarbonate composition solution has a pH that is more than 0.8 below the pH of the solvent, adding a base stabilizer to the polycarbonate composition to form a base stabilized polycarbonate composition, wherein the base stabilizer is added to the polycarbonate composition in an amount such that a sample of the base stabilized polycarbonate composition dissolved in the solvent has a non-aqueous pH that is in a range of equal to or between 0.8 below and 0.5 above the pH of the solvent, thereby forming an isosorbide-containing polycarbonate composition.

In a second embodiment a method of forming an isosorbide-containing polycarbonate composition comprises the steps of: (I) combining a polycarbonate comprising repeat units derived from isosorbide with a polycarbonate-property-modifying additive to form a polycarbonate composition, (II) adding a pH stabilizing agent to the polycarbonate composition to form a pH stabilized polycarbonate composition, wherein the pH stabilizing agent is added to the polycarbonate composition in an amount such that a sample of the pH stabilized polycarbonate composition dissolved in dichloromethane forms a 10 wt % polycarbonate composition solution which has a non-aqueous pH that is in a range of equal to or between 0.8 below and 0.5 above the non-aqueous pH of dichloromethane, thereby forming an isosorbide-containing polycarbonate composition.

In a third embodiment, an isosorbide-containing polycarbonate composition comprises a polycarbonate comprising repeat units derived from isosorbide, a polycarbonate-property-modifying additive, and a pH stabilizer, wherein when a solution containing 10 wt. % of the polycarbonate composition dissolved in dichloromethane is prepared the solution has a non-aqueous pH in a range of equal to or between 0.8 below and 0.5 above the pH of the dichloromethane.

The Isosorbide Monomer and Optional Additional Monomers:

The polycarbonate compositions and methods of forming the polycarbonate composition require an isosorbide-containing polycarbonate. The phrases "isosorbide-containing polycarbonate", "polycarbonate containing isosorbide", "polycarbonate comprising repeat units derived from isosorbide", and related phrases are used interchangeably herein. The isosorbide monomer has the following structure:

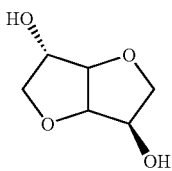

The method used to make the isosorbide-containing polymer is not particularly limited. For example known polymerization methods suitable for preparing the isosorbide-containing polycarbonate include solid state polymerization, interfacial polymerization, and melt polymerization. In a preferred embodiment however, a melt polymerization reaction scheme is used to produce the polycarbonate where a diaryl carbonate is reacted with the isosorbide, and optionally additional monomers, to link the free hydroxyl ends of the isosorbide monomer to produce the polycarbonate. In a most preferred embodiment, the diaryl carbonate is an ester-substituted diaryl carbonate such as bismethylsalicylcarbonate (BMSC). Use of ester-substituted diaryl carbonates in the production of polycarbonate is described in U.S. Pat. Nos. 4,323,668, 6,420,512, U.S. Pat. No. 6,506,871, U.S. Pat. No. 6,548,623, U.S. Pat. No. 6,790,929, U.S. Pat. No. 6,518,391, US Patent Application Publication No. 2003/0139529, and US Patent Application Publication No. 2003/0149223 all of which are incorporated herein by reference.

The isosorbide-containing polycarbonate may be a homopolymer, copolymer, terpolymer, or a polymer containing several different residues derived from other monomer compounds in addition to isosorbide. In other words, in some embodiments another monomer compound (e.g. a second monomer compound) or compounds are optionally selected for incorporation into the product polycarbonate. In the case where additional monomer compounds are used to form the isosorbide-containing polycarbonate, the polycarbonate will preferably comprises at least 20 mol %, more preferably at least 40 mol %, and most preferably greater than 60 mol % (for example 80 mol % or more) repeat units derived from isosorbide monomers.

The additional monomer compounds are not limited to dihydroxy compounds or to aromatic dihydroxy compounds. For example, preferred additional monomer compounds include compounds having one or more functional groups capable of reacting with a dihydroxy compound or a diaryl carbonate to give a chemical bond. Some non-limiting examples of such reactive functional groups are carboxylic acid, ester, amine functional groups and their combinations. Typical monomer compounds will have two functional groups capable of reacting with a dihydroxy compound or a diaryl carbonate, however monofunctional compounds may be used as chainstoppers or endcappers, and trifunctional or higher functional compounds may be used as branching agents. However, dihydroxy and aromatic dihydroxy compounds are frequently preferred for use in these types of applications. Suitable dihydroxy compounds and dihydroxy aromatic compounds are those as described in U.S. patent application Ser. No. 11/863,659 which is incorporated herein by reference for all purposes.

In one embodiment the additional monomer component comprises a compound selected from the group consisting of: ethylene glycol, 1,3-Propanediol, 1,2-Propanediol, 1,4-Butanediol, 1,3-Butanediol, 1,5-Pentanediol, 1,6-Hexanediol, 1,7-Heptanediol, 1,10-Decanediol, 1,2-Cyclohexanediol, trans-1,2-Cyclohexanediol, cis-1,2-Cyclohexanediol, 1,4-Cyclohexanedimethanol, 1,2,6-Hexanetriol, resorcinol, PLURONIC® PE 3500 compound, PLURONIC® PE 6100 compound, UNITHOX® 480 ETHOXYLATE compound, and an aliphatic compound such as a $C_{14-44}$ aliphatic diacid (e.g. $C_{36}$ diacid), $C_{14-44}$ aliphatic diol (e.g. $C_{36}$ branched fatty diol), or combination of these such as PRIPOL® 1009 compound.

In another embodiment the additional monomer component(s) comprises a compound selected from the group consisting of: bisphenol-A (BPA), dodecanedioic acid, sebacic acid, and an aliphatic compound such as a $C_{14-44}$ aliphatic diacid (e.g. $C_{36}$ diacid), $C_{14-44}$ aliphatic diol (e.g. $C_{36}$ branched fatty diol), or combination of these such as PRIPOL® 1009 compound. In yet a further preferred embodiment the additional monomer component comprises BPA and $C_{36}$ diacid.

The Polycarbonate-Property-Modifying Agent/Additive:

The polycarbonate compositions and methods of forming the polycarbonate composition include a polycarbonate-property-modifying agent/additive. The method used to combine the additive with the polycarbonate is not particularly limited. In one embodiment the additive is blended with the polycarbonate to disperse the additive throughout the polycarbonate. The method of blending is not limited and can occur via any known method of mixing polymer and additives.

It has been found that the addition of an acidic or basic polycarbonate-property-modifying additive to polycarbonate can alter the pH of the polycarbonate composition to a pH that is different from the initial polycarbonate. The present Inventors believe that polycarbonate-property-modifying additives that are generally acidic or basic in nature when added to the polycarbonate shift the pH of the polycarbonate composition toward the pH of the additive (i.e. in either in an acidic direction in case of an acidic additive or in a basic direction in the case of a basic additive). Compositions containing traditional BPA-type polycarbonate typically are not adversely affected by this pH shift. However, it has herein been found that the properties of isosorbide-containing polycarbonate compositions, and molded articles made therefrom, are particularly dependent upon the pH of the composition.

The present inventors have found that the isosorbide-containing polycarbonate composition that has an acidic or basic property modifying agent should be treated to adjust its pH (e.g. by adding a corresponding basic or acidic stabilizer) according to the methods provided herein prior to molding or treating the composition at elevated temperatures. The methods provided herein are counterintuitive. For example, the addition of a base, such as sodium stearate, to polycarbonate is not typically desirable because the addition of base to traditional polycarbonates typically results in polymer degradation reactions including reduction in polymer qualities including color and molecular weight degradation. However, using the methods provided herein, the addition of pH stabilizer to isosorbide-containing polycarbonate compositions containing polycarbonate-property-modifying additives has been found to be very desirable.

The polycarbonate-property-modifying additive is not particularly limited other than it is preferably added to the polycarbonate to affect the resulting properties of the polycarbonate. Such additives include, among many others, impact modifiers, colorants, mold release agents, fire retardants, and UV stabilizers. In certain embodiments the polycarbonate-property-modifying additive is considered to be either a basic or acidic additive.

The following non-limiting list of polycarbonate-property-modifying additives are considered to be generally acidic in nature: acidic pigments such as pigment yellow (e.g. PALIOTOL™ Yellow K 0961 HD), acidic dyes, acidic impact modifiers (e.g. methyl methacrylate butadiene styrene (MBS) produced by acid coagulation), acidic UV stabilizers, acidic release agents, acidic antioxidants, acidic thermal stabilizers (e.g. tris(di-t-butylphenyl)phosphite).

The following non-limiting list of polycarbonate-property-modifying additives are considered to be generally basic in nature: basic pigments such as pigment blue (PK5095 from Ferro) or Pigment Red (Lithol Scarlet K4165 from BASF), basic dyes, basic impact modifiers, basic UV stabilizers (such as various hindered amine light stabilizers, e.g. TINUVIN® 770 from CIBA®), basic release agents, basic antioxidants, and basic thermal stabilizers.

Polycarbonate-property-modifying additives are added to polycarbonate or polycarbonate compositions in an amount sufficient to modify a property of the polycarbonate. In certain embodiments the additive is added in an amount corresponding to less than 0.1 wt % to 20.0 wt % or more of the total composition (e.g. from 0.1 wt % to 20.0 wt % of the total composition). In other embodiments the additive is added in an amount corresponding to 5.0 wt % to 15.0 wt % of the total composition.

The Base Stabilizer

The base stabilizer is not particularly limited. In a preferred embodiment, the base stabilizer remains active (e.g. it is stable, does not degrade, does not evaporate, does not react other than through acid/base reactions) under compounding and molding conditions (e.g. at temperatures up to 300° C. or higher). Both weak and strong Brønsted bases can be used. In certain embodiments the base stabilizer can be selected from alkali metal hydroxides, alkaline earth metal hydroxides, amines, carboxylic acid salts, and phosphates. In a preferred embodiment however, the base stabilizer will comprise a compound selected from the group consisting of: sodium hydroxide (NaOH), lithium hydroxide (LiOH), potassium hydroxide (KOH), sodium phosphate ($Na_3PO_4$, tribasic), sodium acetate (NaAc), and sodium stearate. Of these compounds sodium hydroxide and sodium stearate are most preferred.

The Acid Stabilizer

The acid stabilizer is not particularly limited. Both weak and strong Brønsted acids can be used. In a preferred embodiment however, the acid stabilizer will comprise a compound selected from the group consisting of: phosphorous acid, phosphoric acid, and carboxylic acids (e.g. benzoic acid, stearic acid, acetic acid, oxalic acid, citric acid, and ascorbic acid). Of these, it is more preferred that the acid stabilizer is a phosphorus-containing acid (e.g. $H_3PO_4$). Other suitable and non limiting examples of phosphorus-containing acids and additional benefits of adding the phosphorus containing acid on the resulting polycarbonate in U.S. patent application Ser. Nos. 11/863,659 and 11/688,551, which are incorporated herein by reference.

Determining Non-Aqueous pH:

The solvent and the method of determining the non-aqueous pH of the prepared solutions is not particularly limited. The solvent is preferably a polar non-aqueous solvent that is in a neutral pH range (e.g. it has a non-aqueous pH in a range of between 5 and 9, more preferably between 5.5 and 8.5). Furthermore, it is preferred that the solvent is of pure or purified form meaning that the solvent contains minimal acidic or basic impurities that can lead to interaction with acidic or basic components in the polycarbonate composition that would shift the pH measurement of the polycarbonate composition away from a true or actual value. To this end it is preferred that the solvent be greater than 99.99 wt % pure (e.g. less than 0.01 wt % acidic or basic impurities).

The solvent is not particularly limited. The solvent is preferably selected such that the polycarbonate composition is capable of being dissolved in the solvent such that acidic and basic species within the polycarbonate composition are available for detection and quantification. In another embodiment, where not all components are dissolvable in a single solvent the solvent is selected, or a cosolvent is added, such that the non-dissolvable acidic or basic components are at least partially solubilized (e.g. swollen) and made available for detection and quantification. Solvents include toluene, tetrahydrofuran, 2-butanone, acetone, ethyl acetate, and dimethyl sulfoxide (DMSO), among many others. However, the solvent system preferably comprises a chlorinated hydrocarbon (e.g. a chlorinated alkane and/or a chlorinated benzene) composition that is capable of dissolving or solubilizing (e.g. swelling) the components of the polycarbonate composition such that the acidic or basic species can be detected and quantified. In a preferred embodiment the solvent is a non-aqueous solvent and is selected from the group consisting of dichloromethane (DCM), chloroform, chlorobenzene, and dichlorobenzene. In a most preferred embodiment high performance liquid chromatography grade DCM is used as the non-aqueous solvent.

In one embodiment the method of determining the non-aqueous pH can be determined using the following method can be performed at or near room temperature (e.g. at or about 20° C.). A 5 to 20 wt % (e.g. preferably a 10 wt %) solution of the polycarbonate composition is made in an appropriate non-aqueous solvent such as dichloromethane (DCM). pH of this solution is measured using a pH meter equipped with a long life Solvotrode pH electrode produced by METROHM® AG for non-aqueous pH measurements (a LiCl, ethanol electrode). Other pH electrodes calibrated for non-aqueous pH measurements can be used. This pH is compared with the pH of the pure solvent (e.g. the selected solvent containing no polycarbonate composition) to determine the pH shift of the composition from that of the solvent. $pH_{shift} = pH_{sample} - pH_{solvent}$.

A secondary calibration of the electrode is done using a basic solution of 100 ppm (volumetric) cyclohexylamine (CHA) in dichloromethane and a 1.0 ppm (volumetric) solution of trifluoroacetic acid (TFA) in dichloromethane. The pH of the CHA solution was set at 8.5 and the pH of the TFA solution was set at 1.0.

The pH values for these calibration solutions are determined after a first calibration of the electrode using a set of aqueous buffers of pH 4.0 and 7.0 as commonly used in aqueous pH measurement. During further use, contact of the electrode with aqueous samples and buffer solutions is avoided since the electrode requires extensive cleaning and regeneration afterwards before reliable and reproducible readings in non-aqueous samples are possible again.

The correct functioning of the electrode and the validity of the calibration was verified on a regular basis after every 5 to 10 sample measurements by determining pH of the TFA and CHA solutions. The electrode is recalibrated using the CHA and TFA solutions when the difference with the target pH values was larger than 0.2.

In between sample measurements, the electrode is cleaned extensively through rinsing and wiping until the pH value of dichloromethane solvent reaches a value of 5.5-5.8.

The pH values for pure solvent, as well as for the secondary calibration solutions of TFA and CHA depends on its grade and age. For consistency, high performance liquid chromatography (HPLC) grade dichloromethane supplied by Acros is used and any remaining solvent is discarded one week after opening.

The pH shift of the polycarbonate composition sample compared to the pH of the pure solvent is then calculated by subtracting the pH of the solvent from the pH of the sample ($pH_{shift} = pH_{sample} - pH_{solvent}$). Positive values indicate an overall basic nature of the polycarbonate composition sample and negative values indicate an overall acidic nature of the sample.

In one embodiment the polycarbonate composition sample solution prepared in DCM has a pH in a range of equal to 0.8 below to 0.5 above the pH of DCM, which is about 5.7 at room temperature of about 20° C. (e.g. a pH of equal to or between 4.9 to 6.2, more preferably equal to or between 5.2 to 6.0).

EXAMPLES

Having described the invention in detail, the following examples are provided. The examples should not be considered as limiting the scope of the invention, but merely as illustrative and representative thereof.

(WE) as used herein is understood to mean "working example" while (CE) is understood to mean "comparative example". The terms "working" and "comparative" are simply used to demonstrate comparisons to other examples. Working and comparative examples may or may not be an example within the scope of the present invention.

In the following examples the following processes, measurements, and experimental tests were performed.

Color stability measurement was performed using a Color-Eye® 7000A spectrophotometer manufactured by Gretag-Macbeth, at an illuminant observer of C/2°. The CIE (Commission Internationale de l'Eclairage) L*, a*, and b* values were determined on 2.5 mm color chips under reflectance mode according to ASTM 6290, and calibrated using a high gloss polycarbonate standard at a white pigment ($TiO_2$) loading of 5 wt %. The color capability was determined from the absorbance spectral data according to the CIELAB color measurement method detailed by CIE (Commission Internationale de l'Eclairage). The values of L*, a*, and b* are reported for the Example tested. Color difference ΔE is calculated as the distance between two points (1 and 2) in color space using the following formula:

$$\Delta E = [(L1-L2)^2 + (a1-a2)^2 + (b1-b2)^2]^{0.5}.$$

pH measurements were made using the pH determination method described above.

Figure 2:
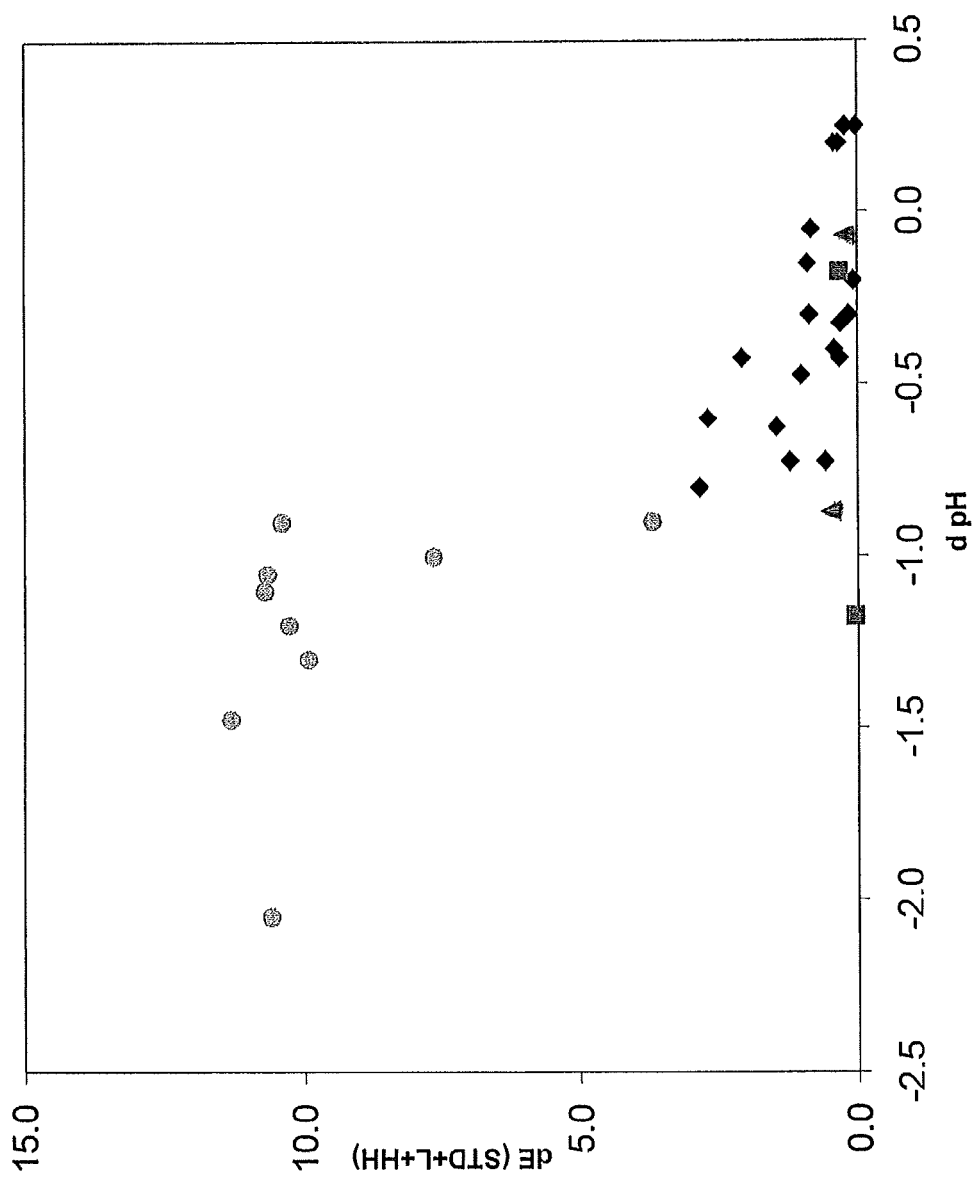
Figure 3:
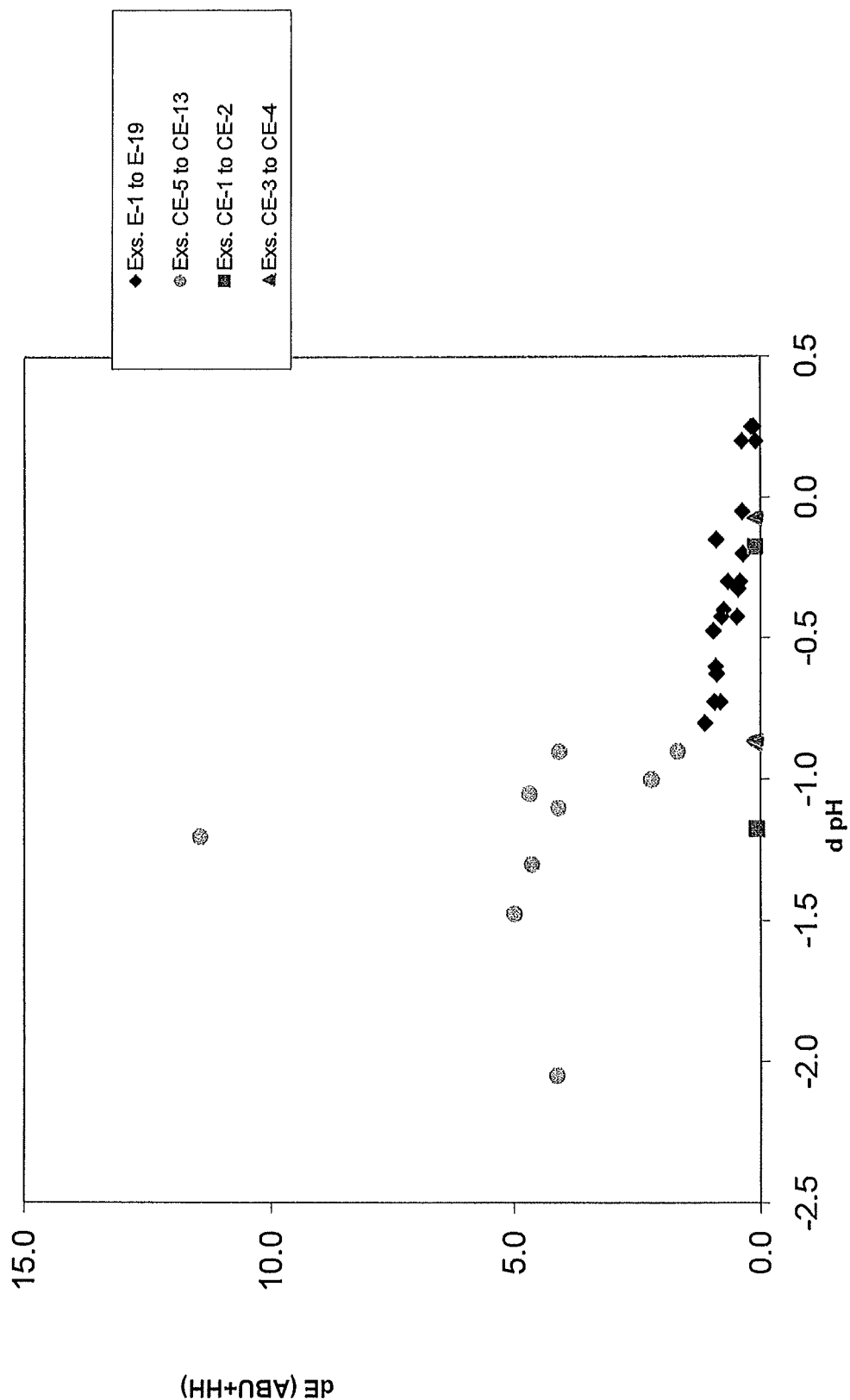
Figure 4:
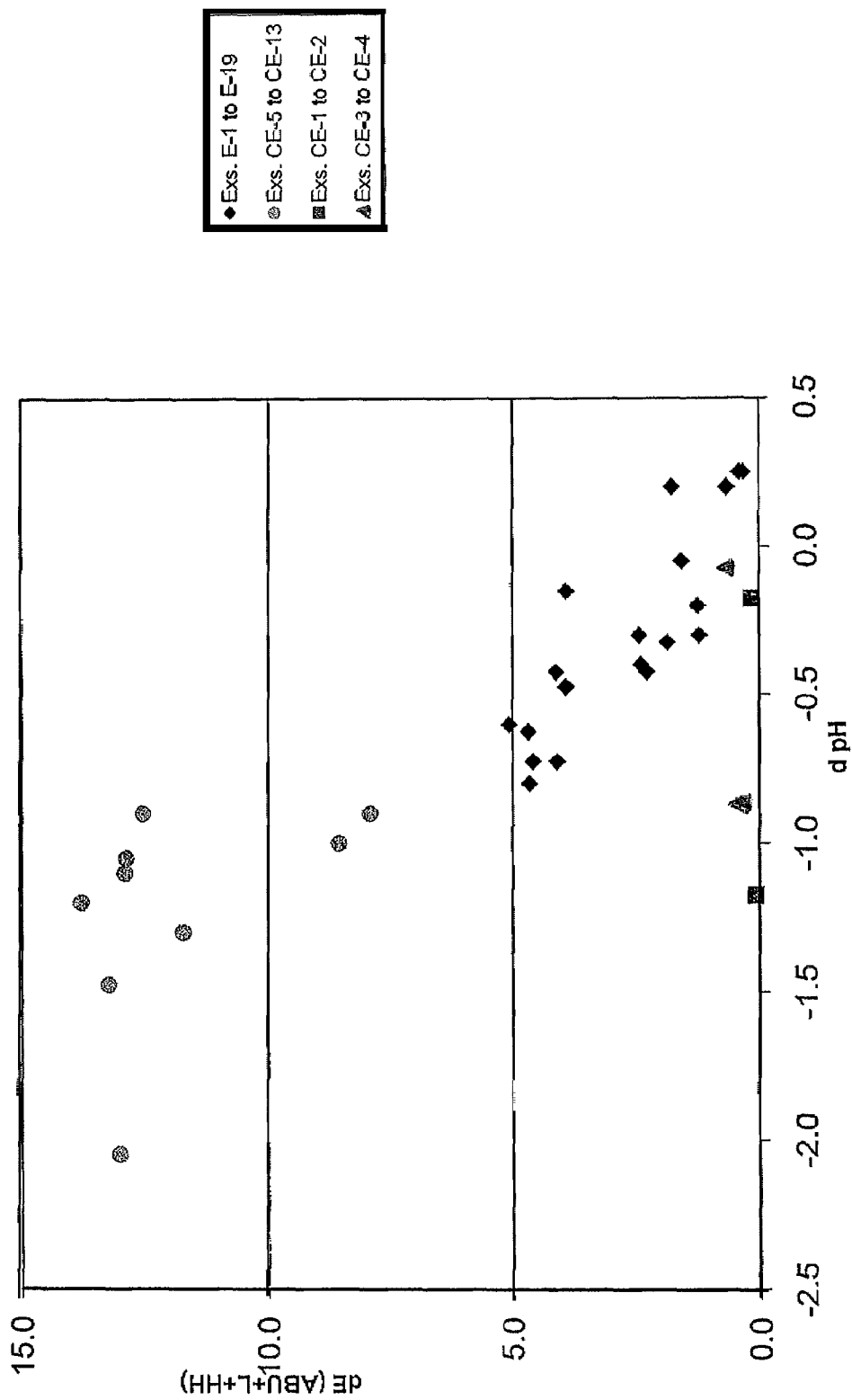

Base polycarbonate compositions including various impact modifying additives are given in Table 1 below. A description of the compounds of these formulations can be found in Table 2. Results are depicted in Tables 3 and 4 and graphically in FIGS. 1 to 4. Formulations A and B are white and are reference materials based on bisphenol-A (BPA) polycarbonate. Formulations C and D are isosorbide-containing polycarbonate blends in white (C) and light grey (D).

TABLE 1

| | | | formulation name: | | | |
|---|---|---|---|---|---|---|
| | | | A | B | C | D |
| resins & impact modifiers | PC-1 | % | 68.12 | 95.47 | | |
| | PC-2 | % | 4.47 | | | |
| | IS-PC | % | | | 89.67 | 89.78 |
| | SAN | % | 11.55 | | | |
| | ABS | % | 11.55 | | | |
| | MBS | % | | | 5.77 | 5.78 |
| colorants | COL-1 | % | 3.8484 | 3.8263 | 3.8458 | 3.6123 |
| | COL-2 | % | 0.0308 | 0.0306 | 0.0308 | 0.0443 |
| | COL-3 | % | 0.0002 | 0.0002 | 0.0002 | |
| | COL-4 | % | 0.0077 | 0.0077 | 0.0077 | |
| | COL-5 | | | | | 0.0077 |
| | COL-6 | | | | | 0.0067 |
| other additives | AO | % | 0.14 | 0.38 | 0.38 | 0.39 |
| | R | % | 0.29 | 0.29 | 0.29 | 0.29 |

TABLE 2

Compound Descriptions

| material | description | source |
|---|---|---|
| PC-1 | BPA polycarbonate resin made by a melt process having MVR of 23.5 to 28.5 g/10 min. (300° C., 1.2 kg) | SABIC Innovative Plastics |
| PC-2 | BPA polycarbonate resin made by a melt process having MVR of 5.1 to 6.9 (300° C., 1.2 kg) | SABIC Innovative Plastics |

TABLE 2-continued

Compound Descriptions

| material | description | source |
|---|---|---|
| IS-PC | Poly(ester-co-carbonate) containing 50% w isosorbide, 18% w fatty acid dimer (Pripol 1009) and 32% w BPA | SABIC Innovative Plastics |
| SAN | Styrene acrylonitrile comprising about 25 wt. % acrylonitrile and 75 wt. % styrene | SABIC Innovative Plastics |
| ABS | High rubber graft emulsion polymerized ABS comprising about 11.1 wt. % acrylonitrile and 38.5 wt. % styrene grafted to about 51 wt. % polybutadiene with a crosslink density of 43-55% | SABIC Innovative Plastics |
| MBS | MBS is nominal 75-82 wt. % butadiene core with a balance styrene-methyl methacrylate shell. Trade name EXL-2691A | Rohm & Haas |
| COL-1 | Kronos 2233 | Kronos Titan GmbH |
| COL-2 | Sicopal Blue K6310 | BASF |
| COL-3 | Sunfast Blue 15:4 C044 | Sun Chemical |
| COL-4 | Colortherm red 180M | Lanxess |
| COL-5 | Monarch 800 | Cabot |
| COL-6 | Sicotan Yellow K2001FG | BASF |
| AO | Stearyl-3-(3', 5'-di-t-butyl-4-hydroxyphenyl) propionate. Trade name: Irganox 1076 | CIBA |
| R | Pentaerythritol tetrastearate (PETS) | Faci SpA |
| KOH | potassium hydroxide pellets purum | Acros Organics |
| NaAc | sodium acetate anhydrous, pro analysis | Acros Organics |
| TFA | trifluoro acetic acid 99% | Acros Organics |
| CHA | cyclohexylamine 98% | Acros Organics |
| NaOH | sodium hydroxide pellets, pro analysis | Acros Organics |
| LiOH | lithium hydroxide >98% powder, reagent grade | Sigma Aldrich |
| $Na_3PO_4$ | sodium phosphate tribasic, puriss. | Riedel-de Haen |
| Na stearate | sodium stearate, 96% mix of stearic & palmitic acid salt | Acros Organics |
| $NaH_2PO_4$ | Sodium phosphate monobasic anhydrous, pro analysis | Acros Organics |
| $H_3PO_3$ | Phosphorous acid 98%, extra pure | Acros Organics |

Table 3 lists a number of compositions based on formulation C. The term 'stabilizer type' means the type of base/acid stabilizer which is used for the pH stabilization of the compositions. The term 'stabilizer level' is the amount of the stabilizer which is used, expressed as ppm (a mass fraction of the total formulation). Six columns of color shift data are given. ΔE is measured and calculated according to the description provided above. Columns labeled 'STD' refer to color data of standard molded color plaques. Standard conditions for molding are those conditions at which the material has sufficient flow to fill the mold. For formulations A and B, standard conditions were molding at 270° C.; for formulations C and D, standard molding was performed at 250° C. Residence time was 3 minutes for all formulations. Abusive conditions are 20 degrees higher in temperature than standard conditions (290° C. for A&B, 270° C. for C&D) and comprise 12 minutes of residence time in the molding machine. Columns labeled 'ABU' refer to color data of abusively molded plaques. Light exposure (L) is combined exposure to daylight/artificial light in a windowsill for a period of time between 8 and 10 hours of daylight+an additional 24 hours of regular office lighting by tubelights. Heat-Humidity treatment (HH) is exposure to 80° C. and 80% relative humidity for 24 hours in the dark. 'L+HH' refers to the combined effect of both light and heat-humidity to which the material is exposed to sequentially starting with the light exposure. The last column, ΔpH, lists the difference in pH of a sample composition solution compared to the solvent in which it has been measured. Details of this measurement and the method are given above (e.g. $\Delta pH=pH_{sample}-pH_{solvent}$). ΔpH was measured on composition pellets.

TABLE 3

| example | formulation | stabilizer type | stabilizer level (ppm) | color shift ΔE STD L | STD HH | STD L + HH | ABU L | ABU HH | ABU L + HH | ΔpH |
|---|---|---|---|---|---|---|---|---|---|---|
| E-1 | C | KOH | 421 | 1.2 | 0.9 | 2.8 | 1.4 | 1.1 | 4.6 | −0.8 |
| E-2 | C | Na stearate | 600 | 1.3 | 0.2 | 0.6 | 1.5 | 0.8 | 4.1 | −0.7 |
| E-3 | C | Na stearate | 600 | 1.1 | 0.3 | 0.4 | 1.4 | 0.8 | 2.4 | −0.4 |
| E-4 | C | Na stearate | 759 | 1.2 | 0.1 | 0.4 | 1.6 | 0.1 | 0.7 | 0.2 |
| E-5 | C | Na stearate | 759 | 1.2 | 0.1 | 0.3 | 1.6 | 0.5 | 2.3 | −0.4 |
| E-6 | C | Na stearate | 759 | 1.2 | 0.1 | 0.1 | 1.9 | 0.4 | 1.2 | −0.3 |
| E-7 | C | $Na_3PO_4$ | 300 | 1.2 | 0.6 | 2.7 | 1.5 | 0.9 | 5.1 | −0.6 |
| E-8 | C | $Na_3PO_4$ | 400 | 1.2 | 0.5 | 2.1 | 1.7 | 0.8 | 4.1 | −0.4 |
| E-9 | C | NaAc | 90 | 1.3 | 0.3 | 1.2 | 1.6 | 0.9 | 4.6 | −0.7 |
| E-10 | C | NaAc | 121 | 1.4 | 0.1 | 0.3 | 2.0 | 0.5 | 1.9 | −0.3 |
| E-11 | C | NaAc | 121 | 1.2 | 0.2 | 0.1 | 1.7 | 0.4 | 1.3 | −0.2 |
| E-12 | C | NaAc | 121 | 1.3 | 0.3 | 0.8 | 1.9 | 0.4 | 1.6 | 0.0 |
| E-13 | C | NaAc | 165 | 1.3 | 0.1 | 0.0 | 2.3 | 0.2 | 0.4 | 0.3 |
| E-14 | C | NaAc | 211 | 1.2 | 0.1 | 0.2 | 2.4 | 0.1 | 0.3 | 0.3 |
| E-15 | C | NaOH | 100 | 1.1 | 0.5 | 1.0 | 1.4 | 1.0 | 3.9 | −0.5 |
| E-16 | C | NaOH | 100 | 1.5 | 0.4 | 0.9 | 1.8 | 0.9 | 3.9 | −0.2 |
| E-17 | C | NaOH | 100 | 1.2 | 0.3 | 1.5 | 1.6 | 0.9 | 4.7 | −0.6 |
| E-18 | C | NaOH | 100 | 1.1 | 0.4 | 0.9 | 1.5 | 0.7 | 2.4 | −0.3 |
| E-19 | C | NaOH | 100 | 1.1 | 0.2 | 0.3 | 1.4 | 0.4 | 1.8 | 0.2 |

Table 4 lists a number of comparative examples. CE-1 to CE-4 do not contain isosorbide-containing polycarbonate as they are based on formulations A and B. CE-5 to CE-13 do not contain a pH stabilizer in an appropriate level. Column headings are similar to those described with reference to Table 3.

TABLE 4

| | | | color shift ΔE | | | | | | |
|---|---|---|---|---|---|---|---|---|---|
| comparative example | formulation | stabilizer type | stabilizer level (ppm) | STD L | STD HH | STD L + HH | ABU L | ABU HH | ABU L + HH | ΔpH |
| CE-1 | A | H$_3$PO$_3$ | 14 | 2.3 | 0.1 | 0.5 | 2.4 | 0.1 | 0.4 | −0.9 |
| CE-2 | A | NaOH | 100 | 2.0 | 0.0 | 0.2 | 2.3 | 0.1 | 0.7 | −0.1 |
| CE-3 | B | H$_3$PO$_3$ | 14 | 0.1 | 0.1 | 0.0 | 0.2 | 0.1 | 0.1 | −1.2 |
| CE-4 | B | NaOH | 100 | 0.1 | 0.2 | 0.3 | 0.1 | 0.1 | 0.2 | −0.2 |
| CE-5 | C | H$_3$PO$_3$ | 14 | 1.4 | 4.1 | 11.3 | 1.6 | 5.0 | 13.2 | −1.5 |
| CE-6 | C | H$_3$PO$_3$ | 14 | 1.5 | 3.5 | 10.4 | 1.6 | 4.1 | 12.5 | −0.9 |
| CE-7 | C | H$_3$PO$_3$ | 14 | 1.8 | 4.0 | 10.7 | 2.1 | 4.7 | 12.9 | −1.1 |
| CE-8 | C | H$_3$PO$_3$ | 14 | 1.9 | 3.4 | 10.6 | 2.2 | 4.1 | 13.0 | −2.1 |
| CE-9 | D | H$_3$PO$_3$ | 14 | 0.2 | 8.3 | 10.3 | 0.3 | 11.4 | 13.8 | −1.2 |
| CE-10 | C | LiOH | 59 | 0.9 | 2.2 | 7.7 | 1.4 | 2.2 | 8.6 | −1.0 |
| CE-11 | C | Na stearate | 351 | 1.1 | 4.1 | 9.9 | 1.5 | 4.6 | 11.7 | −1.3 |
| CE-12 | C | Na stearate | 400 | 1.1 | 0.8 | 3.7 | 1.3 | 1.7 | 7.9 | −0.9 |
| CE-13 | C | NaH$_2$PO$_4$ | 600 | 1.6 | 3.6 | 10.7 | 1.7 | 4.1 | 12.9 | −1.1 |

As can be seen by the results provided in Tables 3 and 4 and in FIGS. 1 to 4, the present invention provides methods for preparing isosorbide-containing polycarbonate compositions as well as the compositions themselves that are superior to those that are not pH stabilized. This is a surprising result because compositions containing polycarbonate having no isosorbide do not have the same susceptibility to variation in pH. See the comparative examples.

The invention claimed is:

1. A method of forming an isosorbide-containing polycarbonate composition, the method comprising the steps of:
   (I) combining a polycarbonate comprising repeat units derived from isosorbide with a polycarbonate-property-modifying additive to form a polycarbonate composition,
   (II) dissolving a sample from the polycarbonate composition in a non-aqueous solvent to form a polycarbonate composition solution,
   (III) determining the non-aqueous pH of the polycarbonate composition solution and determining the non-aqueous pH of the solvent,
   (IV) comparing the pH of the solvent with the pH of the polycarbonate composition solution, and if the pH of the polycarbonate composition solution is more than 0.8 below or more than 0.5 above the pH of the solvent then taking an action selected from the group consisting of:
      (a) if the polycarbonate composition solution has a pH that is more than 0.5 above the pH of the solvent, adding an acid stabilizer to the polycarbonate composition to form an acid stabilized polycarbonate composition, wherein the acid stabilizer is added to the polycarbonate composition in an amount such that a sample of the acid stabilized polycarbonate composition dissolved in the solvent has a non-aqueous pH that is in a range of equal to or between 0.8 below and 0.5 above the pH of the solvent, and
      (b) if the polycarbonate composition solution has a pH that is more than 0.8 below the pH of the solvent, adding a base stabilizer to the polycarbonate composition to form a base stabilized polycarbonate composition, wherein the base stabilizer is added to the polycarbonate composition in an amount such that a sample of the base stabilized polycarbonate composition dissolved in the solvent has a non-aqueous pH that is in a range of equal to or between 0.8 below and 0.5 above the pH of the solvent, thereby forming an isosorbide-containing polycarbonate composition.

2. The method of claim 1, wherein step (V) further includes: comparing the pH of the solvent with the pH of the polycarbonate composition solution, and if the pH of the polycarbonate composition solution is more than 0.5 below or more than 0.3 above the pH of the solvent then taking an action selected from the group consisting of:
   (a) if the polycarbonate composition solution has a pH that is more than 0.3 above the pH of the solvent, adding an acid stabilizer to the polycarbonate composition to form an acid stabilized polycarbonate composition, wherein the acid stabilizer is added to the polycarbonate composition in an amount such that a sample of the acid stabilized polycarbonate composition dissolved in the solvent has a non-aqueous pH that is in a range of equal to or between 0.5 below and 0.3 above the pH of the solvent, and
   (b) if the polycarbonate composition solution has a pH that is more than 0.5 below the pH of the solvent, adding a base stabilizer to the polycarbonate composition to form a base stabilized polycarbonate composition, wherein the base stabilizer is added to the polycarbonate composition in an amount such that a sample of the base stabilized polycarbonate composition dissolved in the solvent has a non-aqueous pH that is in a range of equal to or between 0.5 below and 0.3 above the pH of the solvent.

3. The method of claim 1, wherein a base stabilizer is added to the polycarbonate composition to form a base stabilized polycarbonate composition, wherein the base stabilizer is selected from the group consisting of: sodium hydroxide, lithium hydroxide, potassium hydroxide, sodium phosphate, sodium acetate, and sodium stearate.

4. The method of claim 1, wherein an acid stabilizer is added to the polycarbonate composition to form an acid stabilized polycarbonate composition, wherein the acid stabilizer is selected from the group consisting of carboxylic acids, phosphorous acid, and phosphoric acid.

5. The method of claim 1, wherein the polycarbonate property modifying additive is an acidic additive added in an amount such that it makes up between 0.1 to 20.0 wt %, inclusive, of the total composition, and wherein the acidic additive is selected from the group consisting of: acidic pigments, acidic dyes, acidic impact modifiers, acidic UV stabilizers, acidic release agents, acidic antioxidants, and acidic thermal stabilizers.

6. The method of claim 1, wherein the polycarbonate property modifying additive is a basic additive added in an amount such that it makes up between 0.1 to 20.0 wt %, inclusive, of the total composition, and wherein the basic additive is selected from the group consisting of basic pigments, basic dyes, basic impact modifiers, basic UV stabilizers, basic release agents, basic antioxidants, and basic thermal stabilizers.

7. The method of claim 1, wherein the solutions prepared in steps (II) and (IV) are prepared by dissolving the corresponding sample in a non-aqueous solvent selected from the group consisting of: dichloromethane (DCM), chloroform, chlorobenzene, and dichlorobenzene, wherein the solutions comprise between 5 and 20 wt %, inclusive, of the corresponding sample.

8. A method of forming an isosorbide-containing polycarbonate composition, the method comprising the steps of:
(I) combining a polycarbonate comprising repeat units derived from isosorbide with a polycarbonate-property-modifying additive to form a polycarbonate composition,
(II) adding a pH stabilizing agent to the polycarbonate composition to form a pH stabilized polycarbonate composition, wherein the pH stabilizing agent is added to the polycarbonate composition in an amount such that a sample of the pH stabilized polycarbonate composition dissolved in dichloromethane forms a 10 wt % polycarbonate composition solution which has a non-aqueous pH that is in a range of equal to or between 0.8 below and 0.5 above the non-aqueous pH of dichloromethane,
thereby forming an isosorbide-containing polycarbonate composition.

9. The method of claim 8, wherein step (II) is performed such that a sample of the pH stabilized polycarbonate composition dissolved in dichloromethane forms a 10 wt % polycarbonate composition solution which has a non-aqueous pH that is in a range of equal to or between 0.5 below and 0.3 above the non-aqueous pH of dichloromethane.

10. The method of claim 8, wherein a base stabilizer is added to the polycarbonate composition to form a base stabilized polycarbonate composition, wherein the base stabilizer is selected from the group consisting of: sodium hydroxide, lithium hydroxide, potassium hydroxide, sodium phosphate, sodium acetate, and sodium stearate.

11. The method of claim 8, wherein an acid stabilizer is added to the to the polycarbonate composition to form an acid stabilized polycarbonate composition, wherein the acid stabilizer is selected from the group consisting of carboxylic acids, phosphorous acid, and phosphoric acid.

12. The method of claim 8, wherein the polycarbonate property modifying additive is an acidic additive added in an amount such that it makes up between 0.1 to 20.0 wt %, inclusive, of the total composition, and wherein the acidic additive is selected from the group consisting of: acidic pigments, acidic dyes, acidic impact modifiers, acidic UV stabilizers, acidic release agents, acidic antioxidants, and acidic thermal stabilizers.

13. The method of claim 8, wherein the polycarbonate property modifying additive is a basic additive added in an amount such that it makes up between 0.1 to 20.0 wt %, inclusive, of the total composition, and wherein the basic additive is selected from the group consisting of basic pigments, basic dyes, basic impact modifiers, basic UV stabilizers, basic release agents, basic antioxidants, and basic thermal stabilizers.

14. An isosorbide-containing polycarbonate composition, comprising: a polycarbonate comprising repeat units derived from isosorbide, a polycarbonate-property-modifying additive, and a pH stabilizer, wherein when a solution containing 10 wt. % of the polycarbonate composition dissolved in dichloromethane is prepared the solution has a non-aqueous pH in a range of equal to or between 0.8 below and 0.5 above the pH of the dichloromethane.

15. The composition of claim 14, wherein when a solution containing 10 wt. % of the polycarbonate composition dissolved in dichloromethane is prepared the solution has a non-aqueous pH in a range of equal to or between 0.5 below and 0.3 above the pH of the dichloromethane.

16. The composition of claim 14, wherein the isosorbide-containing polycarbonate comprises at least 20 mol % repeat units derived from isosorbide monomers.

17. The composition of claim 16, wherein the polycarbonate-property-modifying additive is an acidic additive added in an amount such that it makes up between 0.1 to 20.0 wt %, inclusive, of the total composition, wherein the acidic additive is selected from the group consisting of: acidic pigments, acidic dyes, acidic impact modifiers, acidic UV stabilizers, acidic release agents, acidic antioxidants, and acidic thermal stabilizers, and wherein the pH stabilizer is a base stabilizer selected from the group consisting of: sodium hydroxide, lithium hydroxide, potassium hydroxide, sodium phosphate, sodium acetate, and sodium stearate.

18. The composition of claim 16, wherein the polycarbonate-property-modifying additive is a basic additive added in an amount such that it makes up between 0.1 to 20.0 wt %, inclusive, of the total composition, and wherein the basic additive is selected from the group consisting of basic pigments, basic dyes, basic impact modifiers, basic UV stabilizers, basic release agents, basic antioxidants, and basic thermal stabilizers, and wherein the pH stabilizer is an acid stabilizer is added to the polycarbonate composition to form an acid stabilized polycarbonate composition, wherein the acid stabilizer is selected from the group consisting of carboxylic acids, phosphorous acid, and phosphoric acid.

19. An isosorbide-containing polycarbonate composition, comprising: a polycarbonate comprising repeat units derived from isosorbide, a polycarbonate-property-modifying additive, and a pH stabilizer, wherein when a solution containing 10 wt. % of the polycarbonate composition dissolved in dichloromethane is prepared, the solution has a non-aqueous pH in a range of equal to or between 4.9 to 6.2 at 20° C.

* * * * *